United States Patent
Kaltenbach

(10) Patent No.: US 8,251,866 B2
(45) Date of Patent: Aug. 28, 2012

(54) METHOD FOR STARTING THE COMBUSTION ENGINE DURING A LOAD SHIFT IN PARALLEL HYBRID VEHICLES

(75) Inventor: Johannes Kaltenbach, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 387 days.

(21) Appl. No.: 12/671,134

(22) PCT Filed: Aug. 8, 2008

(86) PCT No.: PCT/EP2008/060439
§ 371 (c)(1),
(2), (4) Date: Jan. 28, 2010

(87) PCT Pub. No.: WO2009/021912
PCT Pub. Date: Feb. 19, 2009

(65) Prior Publication Data
US 2010/0204005 A1    Aug. 12, 2010

(30) Foreign Application Priority Data
Aug. 16, 2007 (DE) .......... 10 2007 038 771

(51) Int. Cl.
*B60W 10/02* (2006.01)
*B60W 10/08* (2006.01)
(52) U.S. Cl. ........................... 477/5
(58) Field of Classification Search ........ 477/3, 5, 477/15, 20, 70, 73, 77, 79, 107
See application file for complete search history.

(56) References Cited

U.S. PATENT DOCUMENTS

| | | | |
|---|---|---|---|
| 4,021,712 | A | 5/1977 | Ishihara et al. |
| 5,890,392 | A | 4/1999 | Ludanek et al. |
| 6,059,059 | A | 5/2000 | Schmidt-Brucken |
| 6,077,189 | A | 6/2000 | Kosik et al. |
| 6,166,512 | A | 12/2000 | Kojima |
| 6,176,807 | B1 | 1/2001 | Oba et al. |
| 6,319,168 | B1 | 11/2001 | Morris et al. |
| 6,504,259 | B1 | 1/2003 | Kuroda et al. |
| 6,505,109 | B1 | 1/2003 | Strandell et al. |
| 6,506,139 | B2 | 1/2003 | Hirt et al. |
| 6,524,219 | B2 | 2/2003 | Mesiti et al. |
| 6,543,561 | B1 | 4/2003 | Pels et al. |
| 6,574,535 | B1 | 6/2003 | Morris et al. |
| 6,871,734 | B2 | 3/2005 | Kupper et al. |
| 6,887,184 | B2 | 5/2005 | Buchannan et al. |
| 6,938,713 | B1 | 9/2005 | Tahara et al. |
| 7,395,837 | B2 | 7/2008 | Foster et al. |
| 7,464,616 | B2 | 12/2008 | Leibbrandt et al. |
| 7,500,932 | B2 | 3/2009 | Katakura et al. |
| 7,998,021 | B2 * | 8/2011 | Matsubara et al. ............... 477/3 |
| 2003/0010548 | A1 | 1/2003 | Mesiti et al. |
| 2005/0088123 | A1 | 4/2005 | Wakitani et al. |
| 2005/0164827 | A1 | 7/2005 | Beaty et al. |

(Continued)

FOREIGN PATENT DOCUMENTS
DE     44 36 914 A1     5/1996
(Continued)

*Primary Examiner* — Justin Holmes
(74) *Attorney, Agent, or Firm* — Davis & Bujold, P.L.L.C.

(57) ABSTRACT

A method for starting the internal combustion engine, in parallel hybrid vehicles, in which the internal combustion engine is started, during a shift under load in purely electric driving operation, by the electric machine.

8 Claims, 2 Drawing Sheets

U.S. PATENT DOCUMENTS

| | | |
|---|---|---|
| 2005/0209047 A1 | 9/2005 | Berger et al. |
| 2005/0221947 A1 | 10/2005 | Mesiti et al. |
| 2006/0113858 A1 | 6/2006 | Hino et al. |
| 2006/0199696 A1 | 9/2006 | Gouda et al. |
| 2007/0056783 A1 | 3/2007 | Joe et al. |
| 2007/0095584 A1 | 5/2007 | Roske et al. |
| 2007/0102211 A1 | 5/2007 | Nozaki et al. |
| 2007/0114081 A1* | 5/2007 | Iwanaka et al. ............. 180/65.3 |
| 2007/0227790 A1* | 10/2007 | Tanishima .................. 180/65.2 |
| 2007/0259755 A1* | 11/2007 | Tanishima ........................ 477/3 |
| 2008/0036322 A1 | 2/2008 | Franke |
| 2008/0245332 A1 | 10/2008 | Rimaux et al. |
| 2009/0051309 A1 | 2/2009 | Rehm et al. |
| 2009/0146615 A1 | 6/2009 | Zillmer et al. |
| 2009/0223727 A1 | 9/2009 | Tolksdorf |

FOREIGN PATENT DOCUMENTS

| | | |
|---|---|---|
| DE | 196 31 983 C1 | 2/1998 |
| DE | 197 09 457 A1 | 9/1998 |
| DE | 198 14 402 A1 | 10/1999 |
| DE | 199 45 473 A1 | 4/2000 |
| DE | 199 39 334 A1 | 3/2001 |
| DE | 101 26 348 A1 | 1/2002 |
| DE | 103 40 529 A1 | 3/2004 |
| DE | 103 27 306 A1 | 1/2005 |
| DE | 10 2004 022 767 A1 | 7/2005 |
| DE | 600 22 593 T2 | 2/2006 |
| DE | 698 31 468 T2 | 6/2006 |
| DE | 10 2005 015 657 A1 | 10/2006 |
| DE | 10 2006 019 679 A1 | 11/2006 |
| DE | 10 2005 057 607 B3 | 4/2007 |
| DE | 10 2005 051 382 A1 | 5/2007 |
| DE | 11 2006 001 985 T5 | 5/2008 |
| EP | 1 167 834 A1 | 1/2002 |
| EP | 1 177 930 A2 | 2/2002 |
| EP | 1 219 493 A1 | 7/2002 |
| EP | 13 19 546 A1 | 6/2003 |
| EP | 1 450 074 A2 | 8/2004 |
| EP | 1 468 865 A2 | 10/2004 |
| EP | 1 527 927 A1 | 5/2005 |
| EP | 1 255 656 B1 | 3/2006 |
| EP | 1 714 817 A1 | 10/2006 |
| EP | 1 744 083 A2 | 1/2007 |
| EP | 1 762 417 A1 | 3/2007 |
| EP | 1 785 305 A2 | 5/2007 |
| FR | 2 722 738 A1 | 1/1996 |
| FR | 2 796 437 A1 | 1/2001 |
| FR | 2 892 471 A1 | 4/2007 |
| WO | 00/03163 A1 | 1/2000 |
| WO | 02/086343 A1 | 10/2002 |
| WO | 03/066367 A1 | 8/2003 |
| WO | 2004/111441 A1 | 12/2004 |
| WO | 2006/020476 A2 | 2/2006 |
| WO | 2006/053624 A1 | 5/2006 |

* cited by examiner

METHOD FOR STARTING THE COMBUSTION ENGINE DURING A LOAD SHIFT IN PARALLEL HYBRID VEHICLES

This application is a National Stage completion of PCT/EP2008/060439 filed Aug. 8, 2008, which claims priority from German patent application no. 10 2007 038 771.9 filed Aug. 16, 2007.

FIELD OF THE INVENTION

The present invention relates to a method for starting the internal combustion engine during a shift under load in parallel hybrid vehicles.

BACKGROUND OF THE INVENTION

From the prior art, hybrid vehicles comprising a hybrid transmission are known. In addition to the internal combustion engine they comprise at least one electric motor or electric machine. In serial hybrid vehicles a generator is driven by the internal combustion engine, the generator supplying the electric motor that drives the wheels with electrical energy. Furthermore, parallel hybrid vehicles are known, in which the torque of the internal combustion engine and of at least one electric machine that can be connected to the internal combustion engine are added together. In this case the electric machines can be connected to the belt drive or to the crankshaft of the internal combustion engine. The torques produced by the internal combustion engine and/or the at least one electric machine are transmitted to the driven axle by a downstream transmission.

For example, from DE 102006019679 A1 a drivetrain with an electrically adjustable hybrid transmission and an electrohydraulic control system, a plurality of electric power units and a plurality of torque transmission mechanisms is known. In this the torque transmission mechanisms can be selectively engaged by the electro-hydraulic control system to provide four forward gears, a neutral condition, an electrically adjustable operating mode with lower and higher rotation speeds, and an uphill operating mode.

From DE 102005057607 B3 a hybrid drive for vehicles is known, which contains at least a main motor, in particular an internal combustion engine, a generator, an electric motor and a planetary transmission comprising a sun gear, an ring gear, a planetary gear carrier and planetary gearwheels, which has at least one drive output shaft. In this case it is provided that in a first driving range of the vehicle, to add the torques, the drive output shafts of the main motor and the electric motor are coupled to the sun gear of the planetary transmission, and for a further driving range one of the two motors can be coupled with friction force locking to the ring gear of the planetary transmission in accordance with the superimposition principle for the mechanical addition of the rotation speeds.

In a vehicle with hybrid drive, in accordance with the prior art the motor is switched off when or immediately before the vehicle is at rest, to reduce the fuel consumption of the internal combustion engine.

From US 2005/0221947 A1 a drive control system for a hybrid motor vehicle is known, which comprises an internal combustion engine, a transmission with discrete transmission ratios, an electric machine arranged between the internal combustion engine and the transmission, and a first and a second clutch which can be actuated selectively in order to control the connection of the rotor of the electric machine to the transmission or to the internal combustion engine. In addition, this known drive control system comprises a control device for controlling the internal combustion engine, the electric machine and the clutches, which is designed to perform a start-stop function in which, during a stop phase, the internal combustion engine is separated from the electric machine and the transmission, and switched off.

In a subsequent start phase the connection of the electric machine working as an electric motor to the transmission is formed while a first transmission ratio is engaged in the transmission, so that the vehicle is at first driven by the electric machine. Then a shift from the first transmission ratio to a second, higher transmission ratio is carried out, and during this shift the connection of the internal combustion engine to the electric machine is formed, whereby the internal combustion engine is started. In addition it is provided that while the higher transmission ratio is engaged in the transmission, the connection between the electric machine and the transmission is broken by disengaging the corresponding clutch, which results in an interruption of the traction force. In a subsequent step the connection between the internal combustion engine and the transmission is formed, so that when the start phase has ended the vehicle is being driven by the internal combustion engine and optionally by the electric machine.

SUMMARY OF THE INVENTION

The purpose of the present invention is to indicate a method for starting the internal combustion engine in parallel hybrid vehicles, by carrying out which, the engine can be started comfortably. Furthermore, in the context of start-stop functionality the method according to the invention should reduce the number of disturbances in the drivetrain and increase the comfort level.

According to the claims it is proposed to start the internal combustion engine during a shift under load in purely electrical driving operation by means of the electric machine. In a vehicle in which the internal combustion engine can be connected to the electric machine by a clutch, this can be done by engaging the clutch.

Thanks to the combination of the functions "shift under load" and "starting the internal combustion engine" in accordance with the invention comfort is increased, since each of those functions is a disturbance in the drivetrain and, according to the invention, these take place at the same time.

In a shift under load carried out according to the prior art the speed adaptation of the engine required for synchronization to the new gear takes place with the help of the shift elements involved and action upon the engine torque.

For example, in a traction upshift the transmission capacity of the shift element to be engaged for load transfer is first increased and at the same time the transmission capacity of the shift element to be disengaged is reduced, so that once load transfer has taken place by the shift element to be engaged an engine speed adaptation is effected with the help of the shift elements and action upon the engine torque. In a shift under load in the hybrid drive of a hybrid vehicle the motor is formed by the internal combustion engine and the electric machine, whereas in a shift under load during purely electrical operation the speed of the electric machine is adapted. Then, the shift element to be disengaged is disengaged completely and the shift element being engaged is engaged completely.

According to the prior art, in such shifts under load the internal combustion engine and/or the electric machine remain torque-controlled during the shift with specification of a nominal drive torque, and the shift sequence control system acts correspondingly upon the torque.

In an advantageous further development of the invention it is proposed, in the case of a hybrid vehicle in which a clutch is arranged between the internal combustion engine and the electric machine connected to the transmission, during the shift under load, to carry out the speed adaptation of the electric machine required for synchronization to the new gear by adapting the speed of the electric machine in a speed regulation mode such that the electric machine is adjusted in a speed-controlled manner to the target speed or connection speed (synchronous speed) of the new gear, so that the shift element being engaged is synchronized, and such that during the speed adaptation the internal combustion engine is started by engaging the clutch arranged between the internal combustion engine and the electric machine.

According to the invention the torque at the clutch between the internal combustion engine and the electric machine is transmitted to the speed regulator of the electric machine as a pilot torque, so that once the clutch has caught, the torque from the internal combustion engine is used as a pilot torque for the speed regulator. As further pilot torques for speed regulation the torques of the clutches involved in the shift operation that act upon the electric machine are also used.

Advantageously, and regardless of how the upshift is carried out, during an upshift the mass moment of inertia of the electric machine can be used as the starting torque for the internal combustion engine.

In addition, according to the invention the speed variation of the electric machine is designed so that the speed of the electric machine approaches the target speed with a low gradient.

When the speed of the electric machine reaches the target speed or the synchronous speed of the gear to be engaged, the electric machine is again changed to the torque-regulated mode and the shift element to be engaged is completely engaged. When the shift under load has been completed, the internal combustion engine and the electric machine are coupled via the new gear to the drive output of the transmission.

The starting of the internal combustion engine during a shift under load according to the invention while the hybrid vehicle is being operated purely electrically can be carried out advantageously as part of a start-stop function. This means that the vehicle first starts under purely electric power, and when the driving speed exceeds a threshold value or when more torque is called for by the driver, a shift under load is carried out and the internal combustion engine is started at the same time.

Since the internal combustion engine is started while shift elements in the transmission are in a slipping mode, the engine is advantageously decoupled from the drive output during starting and starting can be carried out comfortably, since in this way the output torque is determined by the condition of the shift elements in the transmission.

Thanks to the concept according to the invention, namely that of regulating the speed of the electric machine during a shift under load, shifting times are made shorter since the speed of an electric machine can be regulated precisely and dynamically. Furthermore, by virtue of the smooth approach of the electric machine's speed to the target speed or synchronous speed of the new gear, particularly great shifting comfort is ensured since the dynamic torque of the internal combustion engine and the electric machine, caused by the mass moment of inertia of the motors, undergoes only a small change at the instant when the shift element being engaged catches. A further advantage of the method according to the invention is that the sequence of the shift under loads is simpler to carry out and to manage compared with a load shift involving action upon the torque as in the prior art.

BRIEF DESCRIPTION OF THE DRAWINGS

Below, an example of the invention is explained in more detail with reference to the attached figures, which show.

DETAILED DESCRIPTION OF THE PREFERRED EMBODIMENTS

Figure 1:
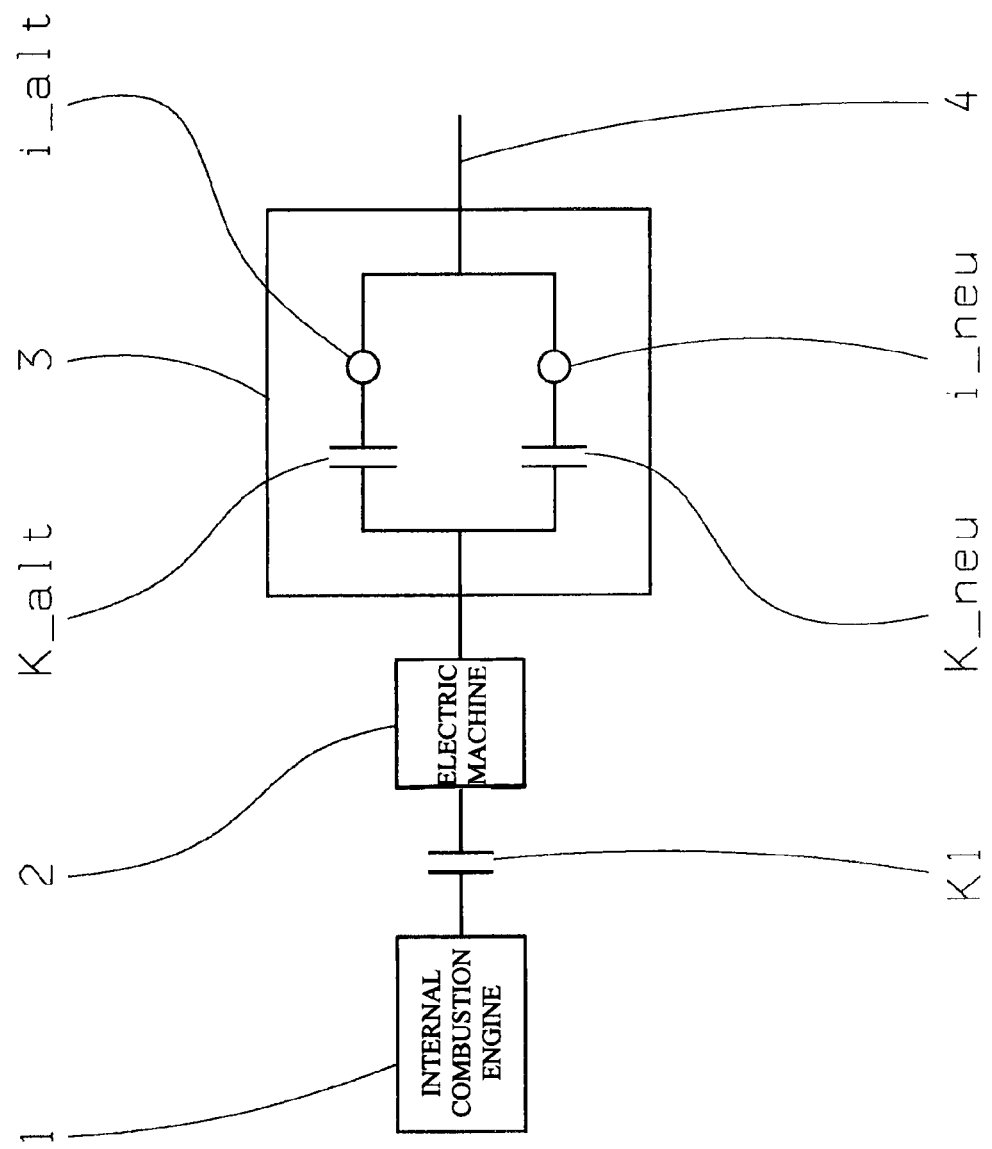
FIG. 1: Schematic and simplified representations of an example drivetrain of a parallel hybrid vehicle.

Referring to FIG. 1, the drivetrain of a parallel hybrid vehicle comprises an internal combustion engine 1 and at least one electric machine 2, arranged one after the other in that order, such that by disengaging a clutch K1 the internal combustion engine 1 can be decoupled from the electric machine 2 and thus also from the drivetrain.

In the force flow direction, after the electric machine 2 is arranged a power shift transmission 3 which, in the simplified example shown in order to illustrate the method according to the invention, comprises a clutch K_neu to be engaged for the new gear to be engaged and a clutch K_alt to be disengaged for the old gear, a transmission ratio step with ratio i_neu and i_alt respectively being associated with each clutch or gear. In FIG. 1 the drive output of the power shift transmission 3 is indexed 4.

As already explained, according to the invention the internal combustion engine is started by the electric machine during a shift under load in purely electric driving operation: in the drivetrain shown in FIG. 1 this takes place by engaging the clutch K1.

In this case the shift under load can take place in such manner that the speed adaptation of the electric machine 2 required for synchronization to the new gear is carried out by adapting the speed of the electric machine 2 in a speed regulation mode, as will be explained in more detail below with reference to a traction upshift from i_alt to i_neu.

According to the invention the shift begins like a conventional shift; first the transmission capacity of the clutch K_neu to be engaged for load transfer is increased and at the same time the transmission capacity of the clutch K_alt to be disengaged is reduced. When load transfer by the clutch K_neu has taken place, the electric machine 2 is changed from the torque-controlled mode to a speed regulation mode and in this speed regulation mode the speed of the electric machine 2 is adapted so that under speed regulation, the electric machine 2 reaches the target speed or synchronous speed of the new gear; at the same time the shift element K_alt being disengaged is completely disengaged. During this speed regulation phase of the electric machine the clutch K1 is engaged, whereby the internal combustion engine is started.

During this the torque at the clutch K1 is transmitted to the speed regulator of the electric machine 2 as a pilot torque, so that when the clutch K1 has caught, the torque of the internal combustion engine 1 is used as the pilot torque for the speed regulator and such that, as further pilot torques for speed regulation, the torques of the clutches K_alt and K_neu involved in the shift, acting upon the electric machine 2, are also used. Moreover, it can be provided that the mass moment of inertia of the electric machine 2 is used as a starting torque for the internal combustion engine.

Figure 2:
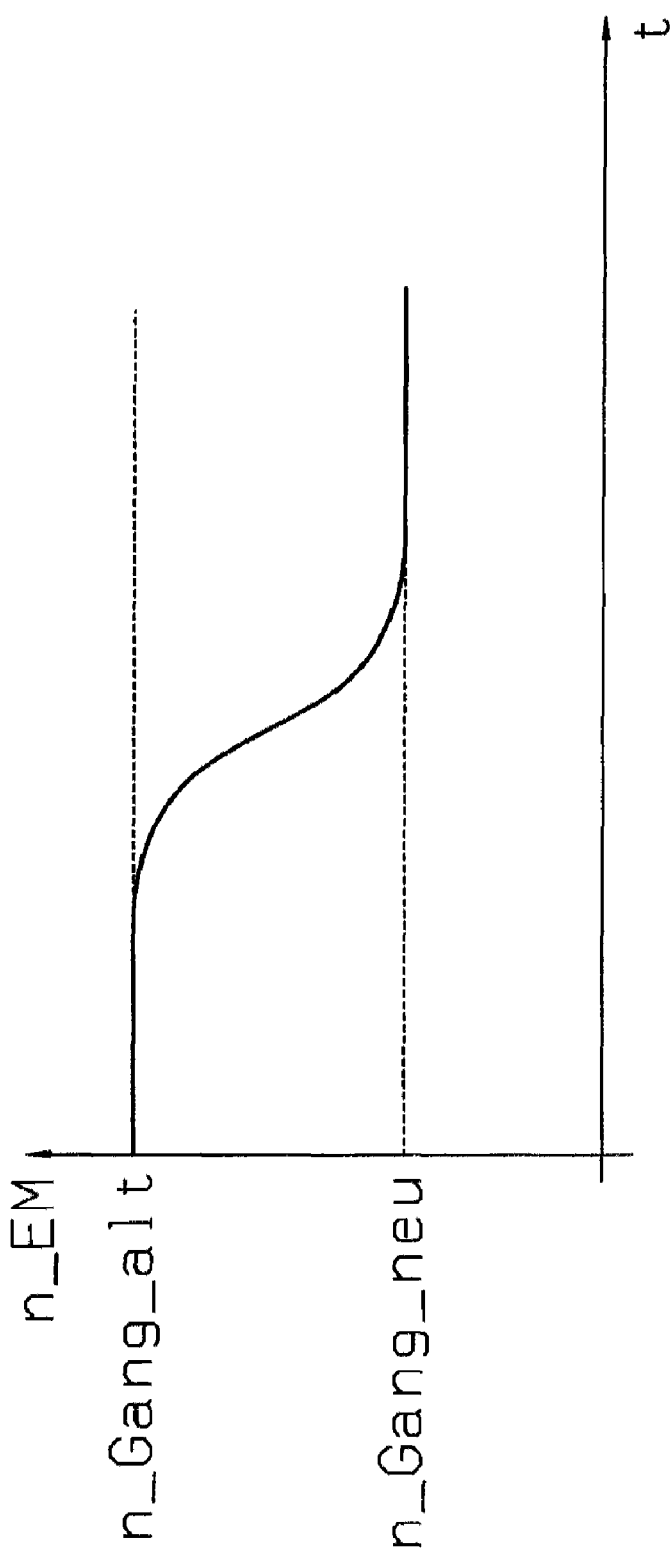
FIG. 2: Diagram showing the variation of the speed of the electric motor during a traction upshift.

The speed variation while the speed of the electric machine 2 is being adapted in the speed regulation mode is preferably designed so that the speed approaches the target speed or connection speed of the new gear with a low gradient. An example variation of the nominal speed n_EM of the electric machine 2 as a function of time t is illustrated in FIG. 2. In the figure, n_Gang_alt denotes the speed of the electric machine 2 while the old gear is engaged (i.e. when the clutch K_alt is engaged), and n_Gang_neu denotes the synchronous speed of the new gear in the traction upshift being carried out.

When the speed then reaches the synchronous speed n_Gang_neu, the electric machine 2 is changed to the torque-regulated mode and the clutch K_neu is engaged completely, so that the now started internal combustion engine 1 and the electric machine 2 are coupled, via the new gear, to the output of the transmission.

In the case of a traction downshift, it is preferable first to reduce the transmission capacity of the clutch K_alt being disengaged, and as soon as slip is detected at K_alt, to change the electric machine 2 from the torque-controlled to the speed regulation mode. Then, the speed of the electric machine 2 is increased to a speed higher than the synchronous speed at the clutch K_neu being engaged, since a positive speed difference is required at K_neu for that clutch to be able to transmit a traction torque.

In a later step the transmission capacity of the clutch K_neu being engaged is increased and the transmission capacity of the clutch K_alt being disengaged is reduced further, so that a continuous load uptake by K_neu is achieved. Once the load has been taken up by the clutch K_neu being engaged, the clutch K_alt being disengaged is disengaged completely and the speed of the electric machine is adjusted to the synchronous speed at the clutch K7_neu being engaged. As already explained, during the phase of regulating the speed of the electric machine, the clutch K1 is engaged whereby the internal combustion engine is started.

When the synchronous speed is reached, the electric machine is changed back to the torque-regulated mode and the clutch K_neu being engaged is engaged completely.

For the case of a thrust downshift, for load transfer the transmission capacity of the clutch K_neu to be engaged is first increased and at the same time the transmission capacity of the clutch K_alt to be disengaged is reduced. When the load has been taken up by K_neu the electric machine is changed from the torque-controlled, to a speed regulation mode and the clutch K_alt being disengaged is disengaged completely. Then, the electric machine is adjusted under speed control to the synchronous speed, so that preferably its speed approaches the target speed with a low gradient. When the synchronous speed has been reached, the electric machine is returned to the torque-regulated mode and the clutch K_neu being engaged is engaged completely.

In principle a thrust upshift and a traction downshift have similar sequences, with the difference that the signs of the torques are different and the speed variation moves in the other direction. Thus, in a thrust upshift the transmission capacity of the clutch K_alt to be disengaged is continually reduced and as soon as slip is detected at K_alt the electric machine is changed from the torque-controlled to the speed regulation mode, in which the speed is reduced to a value below the synchronous speed at the clutch K_neu being engaged, since a negative speed difference is required for the shift element being engaged to be able to transmit torque.

Then, the transmission capacity of the shift element K_neu to be engaged is increased and the transmission capacity of the shift element K_alt being disengaged is reduced, so that continuous load transfer to K_neu takes place.

When the load transfer by the clutch K_neu has been completed, the clutch K_alt being disengaged is disengaged completely and the speed of the electric machine is adjusted in the speed regulation mode to the synchronous speed at the clutch K_neu being engaged. When the synchronous speed is reached, the electric machine is changed back to the torque-regulated mode and the clutch K_neu being engaged is engaged completely.

INDEXES

1 Internal combustion engine
2 Electric machine
3 Power shift transmission
4 Drive output of the power shift transmission
K1 Clutch
K_neu Clutch
K_alt Clutch
n_EM Speed of the electric machine
n_Gang-alt Speed of the electric machine when the old gear is engaged
n_Gang-neu Synchronous speed of the new gear
i_alt Transmission ratio
i_neu Transmission ratio

The invention claimed is:

1. A method of starting an internal combustion engine in a parallel hybrid vehicle in which the internal combustion engine (1) is connectable by a first clutch (K1) to an electric machine (2) which is connected to a transmission (3), the method comprising the steps of:
 transmitting torque, via the first clutch (K1), as a pilot torque to a speed regulator of the electric machine (2) such that torque of the internal combustion engine (1) is used as the pilot torque for the speed regulator when the first clutch (K1) catches;
 utilizing torques of an old clutch (K_alt) and a new clutch (K_neu), which are involved in a shift under load and acting upon the electric machine (2), as further pilot torques for speed regulation;
 adapting a speed of the electric machine (2), during a speed regulation mode, for synchronization with a new gear during the shift under load;
 engaging a first clutch (K1), during the shift under load, and starting the internal combustion engine (1) during the adaptation of the speed of the electric machine (2) and during the shift under load, in a purely electrical driving operation, via the electric machine (2).

2. The method of starting the internal combustion engine according to claim 1, further comprising the step of adapting the speed of the electric machine (2) such that the speed (n_EM) of the electric machine (2) approaches a target speed (n_Gang_neu) with a desired gradient.

3. The method of starting the internal combustion engine according to claim 2, further comprising the step of, when the speed (n_EM) of the electric machine (2) reaches one of the target speed or a synchronous speed (n_Gang_neu) of the new gear being engaged, changing the electric machine (2) to a torque-regulated mode and completely engaging the new clutch (K_neu).

4. The method of starting the internal combustion engine according to claim 1, further comprising the step of utilizing a mass moment of inertia of the electric machine (2) as a starting torque for the internal combustion engine during an upshift.

5. The method of starting the internal combustion engine according to claim 1, further comprising the steps of reducing, in a traction downshift, a transmission capacity of the old clutch (K_alt) which is to be disengaged;

changing the electric machine (2) from a torque-controlled mode to the speed-regulation mode as soon as slip is detected at the old clutch (K_alt) being disengaged;

adjusted the speed of the electric machine (2) to a value higher than a synchronous speed at the new clutch (K_neu) being engaged; and increasing a transmission capacity of the new clutch (K_neu) being engaged and further reducing the transmission capacity of the old clutch (K_alt) being disengaged, to facilitate a continuous load transfer to the new clutch (K_neu) being engaged, such that when the new clutch (K_neu) assumes the load, the old clutch (K_alt) being disengaged is completely disengaged and the speed of the electric machine (2) is adjusted to the synchronous speed at the new clutch (K_neu) being engaged.

6. The method of starting the internal combustion engine according to claim 1, further comprising the step of:

approximately simultaneously increasing, in a thrust downshift, a transmission capacity of the new clutch (K_neu) to be engaged and reducing a transmission capacity of the old clutch (K_alt) to be disengaged; and changing the electric machine (2) from a torque-controlled mode to the speed-regulation mode when the new clutch (K_neu) being engaged assumes the load and the old clutch (K_alt) being disconnected is disengaged completely, and adjusting the electric machine (2) under speed control to a synchronous speed at the new clutch (K_neu) and at approximately the same time the old clutch (K_alt) being disconnected is completely disengaged.

7. A method of starting an internal combustion engine in a parallel hybrid vehicle in which the internal combustion engine (1) is connectable by a first clutch (K1) to an electric machine (2) which is connected to a transmission (3), the method comprising the steps of:

adapting a speed of the electric machine (2), during a speed regulation mode, for synchronization with a new gear during the shift under load;

engaging a first clutch (K1), during the shift under load, and starting the internal combustion engine (1) during the adaptation of the speed of the electric machine (2) and during the shift under load, in a purely electrical driving operation, via the electric machine (2);

approximately simultaneously increasing, in a traction upshift, a transmission capacity of a new clutch (K_neu) to be engaged for load transfer and reducing a transmission capacity of an old clutch (K_alt) to be disengaged; and changing the electric machine (2) to a speed regulation mode when the load transfer to the new clutch (K_neu) occurs, adapting the speed of the electric machine (2) to reach a synchronous speed of the new gear being engaged such that the electric machine (2) is adjusted under speed control to either a target speed or the synchronous speed of the new gear, while approximately simultaneously completely disengaging the old clutch (K_alt).

8. A method of starting an internal combustion engine in a parallel hybrid vehicle in which the internal combustion engine (1) is connectable by a first clutch (K1) to an electric machine (2) which is connected to a transmission (3), the method comprising the steps of:

adapting a speed of the electric machine (2), during a speed regulation mode, for synchronization with a new gear during the shift under load;

engaging a first clutch (K1), during the shift under load, and starting the internal combustion engine (1), during the adaptation of the speed of the electric machine (2) and during the shift under load, in a purely electrical driving operation, via the electric machine (2);

continuously reducing, in a thrust upshift, a transmission capacity of an old clutch (K_alt) to be disengaged;

changing the electric machine (2) from a torque-controlled mode to a speed-regulation mode as soon as slip is detected at the old clutch (K_alt) being disengaged, in which the speed of the electric machine (2) is reduced to a value below the synchronous speed at a new clutch (K_neu) to be engaged;

increasing a transmission capacity of the new clutch (K_neu) being engaged and reducing the transmission capacity of the old clutch (K_alt) being disengaged to transfer continuously the load to the new clutch (K_neu); and completely disengaging the old clutch (K_alt) being disengaged after the load is assumed by the new clutch (K_neu) being engaged and the speed of the electric machine (2) is adjusted in the speed-regulation mode to the synchronous speed at the new clutch (K_neu) being engaged.

* * * * *